US 8,787,225 B2

(12) United States Patent
Muruganathan et al.

(10) Patent No.: US 8,787,225 B2
(45) Date of Patent: Jul. 22, 2014

(54) PHASE-ROTATED REFERENCE SIGNALS FOR MULTIPLE ANTENNAS

(75) Inventors: Siva Dharshan Muruganathan, Kanata (CA); Tarik Tabet, Montreal (CA); Chandra Sekhar Bontu, Kanata (CA); Yi Song, Irving, TX (US); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 126 days.

(21) Appl. No.: 13/546,926

(22) Filed: Jul. 11, 2012

(65) Prior Publication Data

US 2014/0016681 A1 Jan. 16, 2014

(51) Int. Cl.
*H04B 7/00* (2006.01)

(52) U.S. Cl.
USPC .......................................... 370/310

(58) Field of Classification Search
CPC .................. H04B 2201/70701; H04B 1/7075; H04B 1/70753; H04B 7/0413; H04B 7/0682
USPC ................................. 370/310–350
See application file for complete search history.

(56) References Cited

U.S. PATENT DOCUMENTS

| | | | | |
|---|---|---|---|---|
| 7,200,368 | B1 * | 4/2007 | Hottinen et al. | 455/101 |
| 7,940,740 | B2 * | 5/2011 | Krishnamurthy et al. | 370/344 |
| 8,503,481 | B2 * | 8/2013 | Patil et al. | 370/474 |
| 2010/0172373 | A1 * | 7/2010 | Kimura et al. | 370/465 |
| 2011/0274200 | A1 * | 11/2011 | Lee et al. | 375/295 |
| 2013/0003668 | A1 * | 1/2013 | Xiao et al. | 370/329 |
| 2014/0016451 | A1 * | 1/2014 | Muruganathan et al. | 370/210 |
| 2014/0016681 | A1 * | 1/2014 | Muruganathan et al. | 375/219 |

FOREIGN PATENT DOCUMENTS

| | | |
|---|---|---|
| EP | 2367329 A1 | 9/2011 |
| EP | 2442471 A1 | 4/2012 |

OTHER PUBLICATIONS

3GPP, Evolved Universal Terrestrial Radio Access (E-UTRA); Physical Channels and Modulation; TS 36.211 V10.4.0 (Dec. 2011), 101 pgs.
3GPP, Evolved Universal Terrestrial Radio Access (E-UTRA) and Evolved Universal Terrestrial Radio Access Network (E-UTRA); Overall description; TS 36.300 V11.0.0 (Dec. 2011), 194 pgs.
QUALCOMM, "LTE Rel-12 and Beyond", 3GPP RAN Workshop, Ljubljana, Slovenia, Jun. 11-12, 2012, 15 pgs.
E. Dahlman, S. Parkvall, and J. Sköld, 4G LTE/LTE-Advanced for Mobile Broadband, Elsevier Ltd, 2011 (Book).
3GPP, Evolved Universal Terrestrial Radio Access (E-UTRA); Radio Resource Control (RRC); Protocol Specification (Release 10); TS 36.331 V10.5.0 (Mar. 2012), 305 pgs.

(Continued)

*Primary Examiner* — Fan Ng
(74) *Attorney, Agent, or Firm* — Finnegan, Henderson, Farabow, Garrett & Dunner LLP

(57) ABSTRACT

Systems, methods, and apparatuses for phase-rotated reference signals are provided. In accordance with one implementation, phase-rotated reference signals are transmitted from multiple transmit antennas on the same reference signal (RS) resource elements. The receiver may determine channel coefficients for links corresponding to the multiple antennas, based on the received signals at the RS resource elements. Time-domain filtering or frequency-domain orthogonal codes may be used to determine the channel coefficients for links corresponding to the multiple antennas. The phase-rotation information may be broadcasted in a system information block (SIB) message or signaled in a radio resource control (RRC) message.

28 Claims, 10 Drawing Sheets

(56) References Cited

OTHER PUBLICATIONS

Motorola, "DM-RS Antenna Port Mapping and Control Signalling", 3GPP RAN WG1, R1-102138, Beijing, China, Apr. 12-16, 2010, 6 pages.

IEEE 802.16, "MIMO Support for Interference Mitgation", IEEE S80216m-08_587, Denver, USA, Jul. 15, 2008, 28 pages.
European Extended Search Report for Application No. 13176214.8 dated Nov. 19, 2013 (7 pages).
Motorola: "DM-RS Antenna Port Mapping and Control Signalling" 3GPP R1-102138, Beijing, China, Apr. 12-16, 2010 (6 pages).

* cited by examiner

PHASE-ROTATED REFERENCE SIGNALS FOR MULTIPLE ANTENNAS

TECHNICAL FIELD

The present disclosure generally relates to reference signals in wireless communication systems, and more particularly, to phase-rotated reference signals for multiple antennas.

BACKGROUND

In wireless radio access networks, reference signals may be transmitted to facilitate communications between network devices, e.g., base stations, user equipments. The reference signals are known to both the transmitter and the receiver for channel measurement, information demodulation, and the like. The reference signals may also be referred to as pilot signals.

Multi-antenna technologies are frequently used in communication systems to increase transmission data rate and spectral efficiency. Various multi-antenna technologies may be adopted for multi-antenna systems, e.g., spatial multiplexing, transmit diversity, cyclic-delay diversity, or the like. When multiple antennas are employed, reference signals may be transmitted for each transmit antenna such that channels corresponding to each transmit antenna may be measured.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

Figure 1:
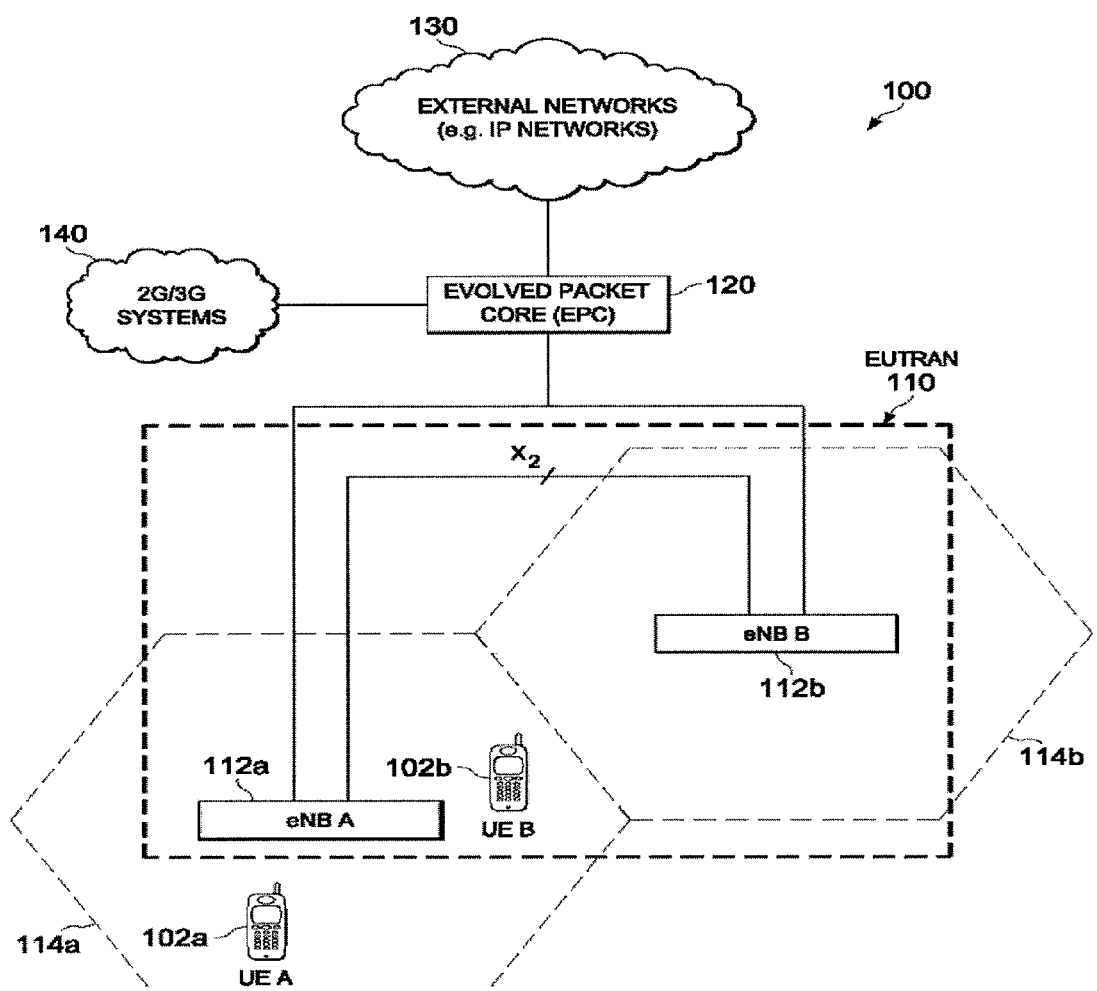
FIG. 1 illustrates an example cellular wireless communication system for implementing methods and systems consistent with the present disclosure.

The present disclosure is directed to systems, methods, and apparatuses for transmitting and receiving reference signals for multiple antennas using same resource elements. In this disclosure, reference signals refer to signals transmitted over a communications system for channel measurements, channel state information estimation, data demodulations, synchronizations, etc. Reference signal overhead refers to the amount of resources occupied by reference signals out of the total available physical resources for the radio communication. Resource element is the basic unit of physical resource in Orthogonal Frequency Division Multiplexing (OFDM) systems. A channel refers to a wireless connection between a transmitter and a receiver. Channel coefficients refer to various parameters which define the channel properties, such as amplitude and phase information. Channel coefficients can be represented in either a time domain or a frequency domain. Channel impulse response is a characterization of the time-varying channel properties, which is composed of a number of communication propagation paths, each having an amplitude, phase, and delay parameter, respectively. Channel frequency response is the frequency-domain representation of the channel impulse response. Phase rotation means adjusting a phase of the original signal by an offset without changing its amplitude. The offset is also referred to as a phase rotation value. Filtering and windowing refer to digital signaling processing techniques to restore, enhance, or separate the input signals.

In a wireless cellular system equipped with multiple antennas, reference signals are transmitted from each transmit antenna, allowing for estimation of channel coefficients for links corresponding to the multiple transmit antennas. The reference signals for multiple transmit antennas are transmitted at different reference signal (RS) resource elements, such that receivers can distinguish received signals from each transmit antenna and determine the corresponding channel coefficients. However, transmitting reference signals for multiple antennas at different resource elements increases reference signal overheads, thereby reducing the effective data transmission rate.

Transmitting reference signals for multiple antennas at the same resource elements reduces reference signal overhead and allows more resource elements to be used for data transmission. In some implementations consistent with this disclosure, reference signals with different phase rotations are transmitted for multiple antennas using the same resource elements. In an orthogonal frequency divisional multiplex (OFDM) wireless system, the effect of phase rotations in the frequency domain is perceived as time delays in the channel impulse response corresponding to the links between the multiple transmit antennas. In some implementations consistent with this disclosure, the receivers are configured to utilize filtering or windowing techniques to separate multiple channel impulse responses in the time domain. For some particular phase rotation values, channel frequency responses corresponding to the different links may be separated in the frequency domain using orthogonal cover codes. In this way, the phase rotation of reference signals reduces reference signal overhead as applied to wireless communication systems, e.g., long term evolution (LTE), and LTE-Advanced (LTE-A).

Reference will now be made in detail to the example embodiments implemented according to the disclosure; the examples are illustrated in the accompanying drawings. Wherever possible, the same reference numbers will be used throughout the drawings to refer to the same or like parts.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including macro cell, femto cell, and pico cell. Base stations are nodes that can relay signals for mobile devices or other base stations. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (i.e., eNB 112a and eNB 112b) and one or more UEs (i.e., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b in which handover may be conducted if one or both of the UEs 102a and UE 102b travels from cell 114a to cell 114b. The UEs 102a and 102b may be any wireless electronic device used by an end-user to communicate, for example, within the LTE system 100. The UE 102a or 102b may be referred to as mobile electronic device, user device, mobile station, subscriber station, or wireless terminal. The UE 102a or 102b may be a cellular phone, personal data assistant (PDA), smart phone, laptop, tablet personal computer (PC), pager, portable computer, or other wireless communications device.

The UEs 102a and 102b may transmit voice, video, multimedia, text, web content and/or any other user/client-specific content. On the one hand, the transmission of some contents, e.g., video and web content, may require high channel throughput to satisfy the end-user demand. On the other hand, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b generate requests, send responses or otherwise communicate in different means with Evolved Packet Core (EPC) 120 and/or Internet Protocol (IP) networks 130 through one or more eNBs 112a and 112b.

Reference signals are transmitted from the eNB 112 to the UEs 102 for many purposes, e.g., channel estimation, channel state information feedback, handover measurements, geographical position estimation, etc. In LTE/LTE-A, several types of downlink reference signals are defined. These signals include cell-specific reference signal (RS), demodulation RS, channel state information RS, Multicast-Broadcast Single Frequency Network (MBSFN) RS, positioning RS, etc. In case that multiple transmit antennas are equipped at the eNB 112, phase-rotated reference signals may be transmitted from the multiple antennas using the same resource elements. The UEs 102 may separate the reference signals transmitted from different antennas by time-domain filtering or making use of frequency-domain orthogonal code covering techniques.

Examples of user equipment include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b directly communicate with one or more UEs 102a, 102b, other eNBs, and the EPC 120.

In some implementations, the eNB 112 may transmit phase-rotated reference signals for multiple transmit antennas at the same RS resource elements in a physical downlink shared channel (PDSCH) region and transmit reference signals for multiple transmit antennas at different RS resource elements in a physical downlink control channel (PDCCH) region, for backward compatibility purposes, i.e., to support legacy UEs that do not have the functionalities to decode the phase-rotated reference signals at the same resource elements. In some other implementations, the eNB 112 may transmit phase-rotated reference signals at RS resource elements in both PDSCH region and PDCCH region, in conjunction with transmitting phase-rotated control signals in other resource elements of the PDCCH region and transmitting phase-rotated data signals in resource elements of the resource blocks allocated for the legacy UEs, such that legacy UEs would be able to decode reference signals and control/ data signals without separating the phase-rotated reference signals from multiple antennas.

The eNBs 112a and 112b may be the end point of the radio protocols towards the UEs 102a, 102b and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
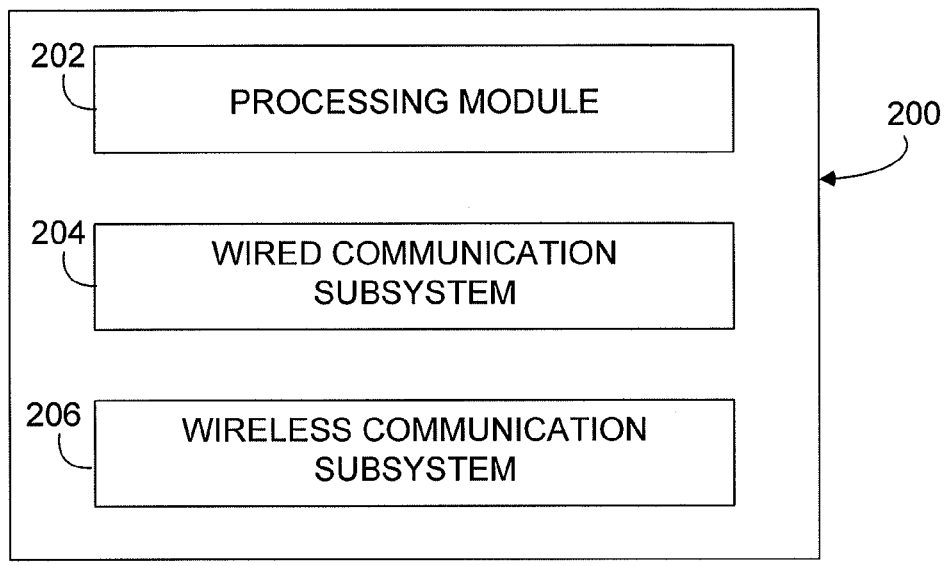
FIG. 2 illustrates an example access node device, in accordance with an embodiment of the present disclosure.

FIG. 2 illustrates an example access node device 200 consistent with certain aspects of this disclosure. The example access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory). For example, the processing module 202 may be configured to transmit phase-rotated reference signals for multiple transmit antennas using the same RS resource elements. The processing module 202 may also be configured to transmit data signals on multiple transmit antennas using Multiple-input Multiple-output (MIMO) transmission techniques such as spatial multiplexing and space frequency block coding (SFBC). In some implementations, the processing module 202 may be configured to transmit phase-rotated control/data signals for the multiple antennas at the same resource elements. Furthermore, the processing module 202 may be configured to include the phase-rotation information in a system information block (SIB) message or in a radio resource control (RRC) message. Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200.

Figure 3:
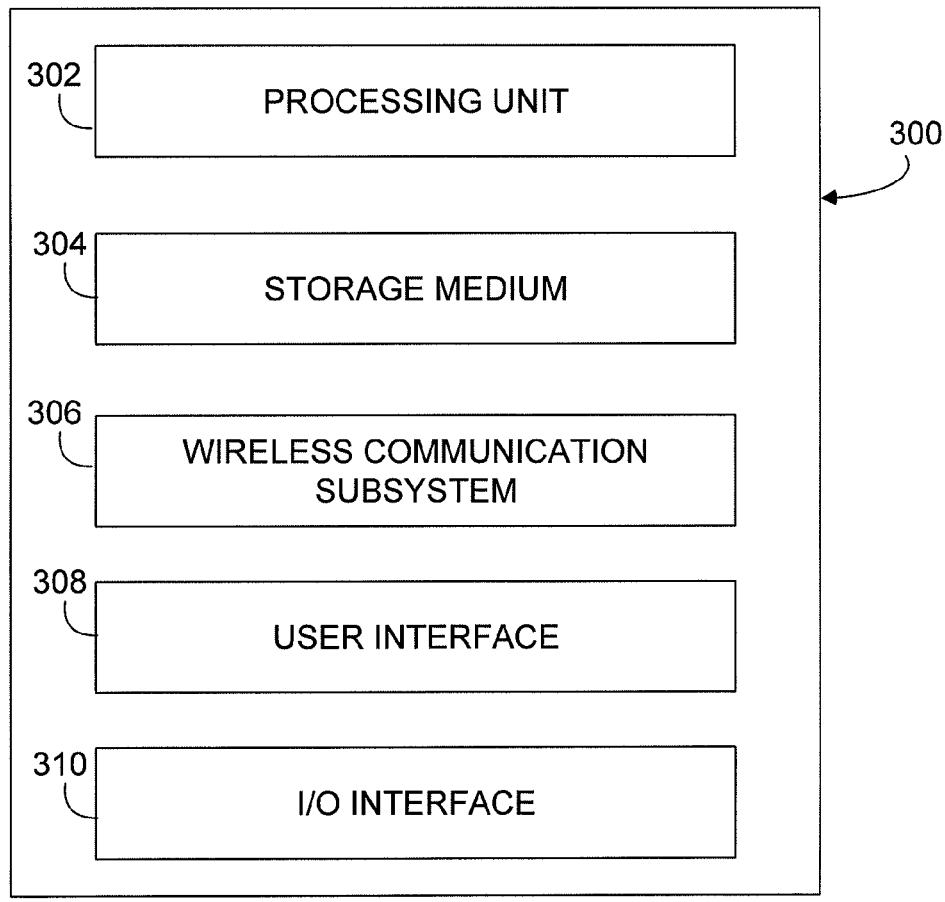
FIG. 3 illustrates an example user equipment device, in accordance with an embodiment of the present disclosure.

FIG. 3 illustrates an example user equipment device 300. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionalities similar to the processing module 202 described with regard to FIG. 2. Moreover, the processing unit 302 may be configured to receive the phase-rotated reference signals. The processing unit 302 may further be configured to determine channel coefficients for links corresponding to the multiple transmit antennas, based on the received phase-rotated reference signals. In some implementations, the processing unit 302 may be configured to decode data signals transmitted from the multiple antennas using MIMO technologies, such as spatial multiplexing and SFBC.

The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 can include, for example, a universal serial bus (USB) interface. A skilled artisan will readily appreciate that various other components can also be included in the example UE device 300.

Figure 4:
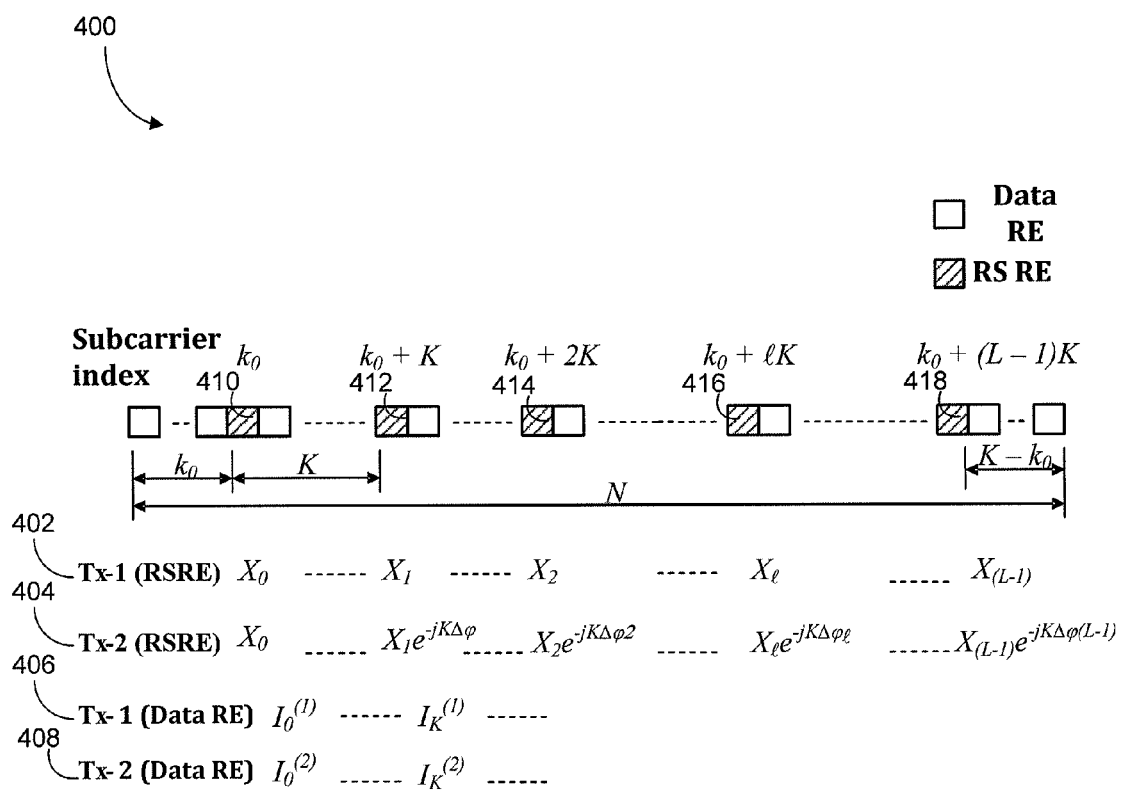
FIG. 4 illustrates an example transmission scheme for reference signals and data signals, in accordance an embodiment of the present disclosure.

FIG. 4 illustrates an example transmission scheme 400 for reference signals (RS) and data signals in an OFDM system. As shown in FIG. 4, every $K^{th}$ resource element (RE) within an OFDM symbol corresponds to a RS resource element, e.g., 410-418. There are a total of N subcarriers and L reference signal resource elements (RSREs) in this example. Other REs that are not for RS transmission are used for data transmission and are referred to as data REs.

In FIG. 4, two transmit antennas are equipped to the transmit entity in this example. The reference signals transmitted on the second antenna 404 are identical to a phase rotation of the reference signals transmitted on the first antenna 402. The phase rotation $\Delta\phi$ is applied in the frequency domain of the reference signal. The frequency domain phase rotation is equivalent to a time shift of $\delta T$ in the time domain where $\delta$ is an integer and T is the sampling time. In some implementations, the phase rotation $\Delta\phi$ can be defined as:

$$\Delta\varphi = \frac{2\pi\delta}{N}, \quad (1)$$

The phase-rotated reference signals 404 on the second transmit antenna can be given by:

$$X_k^\delta = X_k e^{-jK\Delta\phi k} \text{ for } k=0,\ldots,L-1, \quad (2)$$

where L is the total number of RS subcarriers.

The data signals transmitted on the first antenna 406 may be independent from the data signals transmitted on the second antenna 408. Various MIMO techniques may be applied to the data signals 406 and 408. For example, spatial multiplexing, SFBC, or cyclic delay diversity (CDD) techniques may be used for 406 and 408, along with the phase rotation of the reference signals 402 and 404. It should be noted that in this disclosure, the terms of phase rotation and phase shift are inter-exchangeable. Various data transmission methods in conjunction with the phase rotation of the reference signals are summarized in Table 1. Note that in Table 1, $I_v$ and $X_I$ represent the data symbol and reference symbol respectively. Additionally, in the case of spatial multiplexing, $I_v^{(1)}$ and $I_v^{(2)}$ respectively represent the data symbols corresponding to the first transmit antenna (denoted as TX-1) and second transmit antenna (denoted as TX-2).

TABLE 1

Various Attainable Transmission Methods

| Method | Tx-1 (RSRE) | TX-2 (RSRE) | TX-1 (Data RE) | TX-2 (Data RE) |
|---|---|---|---|---|
| CDD (special case) | $X_I$ | $X_I e^{-j2\pi K \Delta \phi l}$ | $I_v$ | $I_v e^{-j2\pi \Delta \phi v}$ |
| Spatial multiplexing | $X_I$ | $X_I e^{-j2\pi K \Delta \phi l}$ | $I_v^{(1)}$ | $I_v^{(2)}$ |
| SFBC | $X_I$ | $X_I e^{-j2\pi K \Delta \phi l}$ | $I_v$ | $\tilde{I}_v$ - coded version of $\{I_v\}$ |

Figure 5:
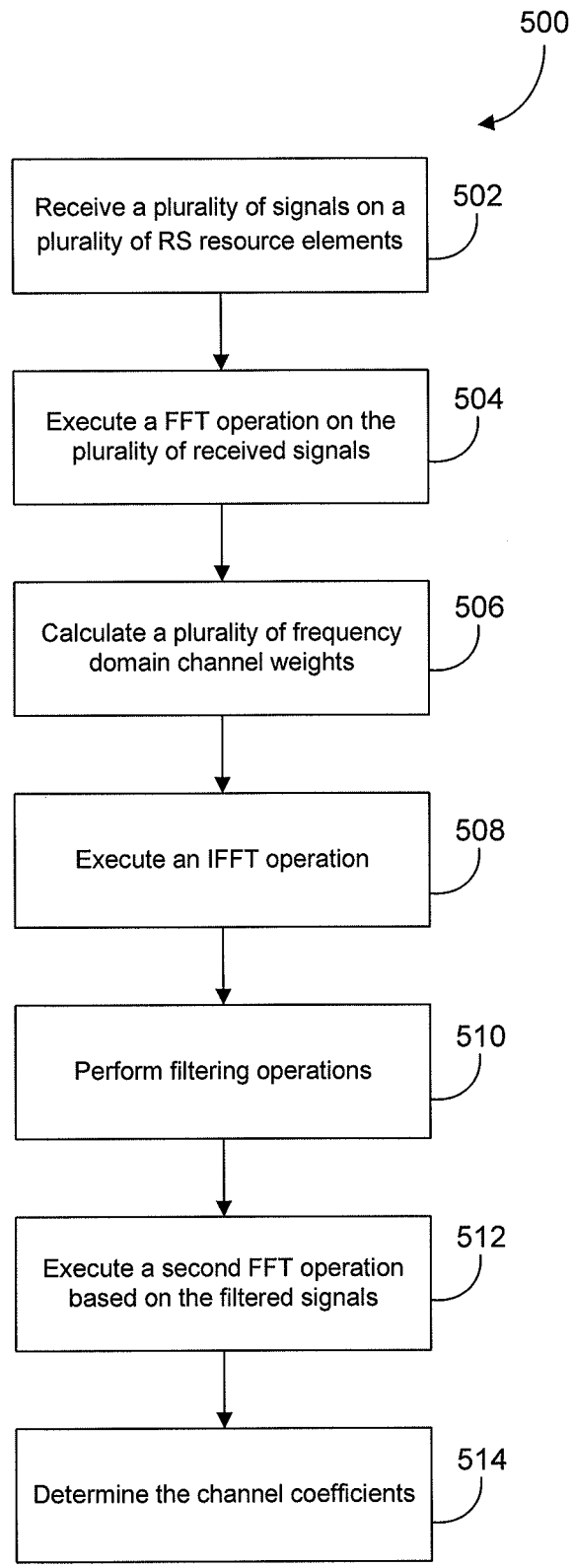
FIG. 5 illustrates a flow diagram of an example method for determining channel coefficients using phase-rotated reference signals, in accordance with an embodiment of the present disclosure.

FIG. 5 illustrates a flow diagram of an example method 500 for determining channel coefficients using phase-rotated reference signals. In this example, the UE (e.g., 102a) is configured to determine the channel coefficients. As shown in FIG. 5, the UE first receives a plurality of signals on a plurality of RS resource elements at 502. The UE then executes a Fast Fourier Transform (FFT) operation on the received plurality of signals at 504 to transform the received time-domain signals to frequency-domain signals. The received plurality of signals at the RS resource elements in the frequency domain can be expressed as follows:

$$Y_r = X_r^\delta \overline{C}_r + X_r \overline{D}_r, \text{ for } r=0, \ldots, L-1, \quad (3)$$

$$Y_r X_r e^{-jK\Delta\phi r} \overline{C}_r + X_r \overline{D}_r, \quad (4)$$

where $\overline{C}_r = C_{k_0+rK}$ and $\overline{D}_r = D_{k_0+rK}$ represents the undersampled frequency response of $\{C_k\}$ and $\{D_k\}$ respectively, and $k_0$ represents the subcarrier offset for the reference signals. For example, in LTE/LTE-A systems, $k_0 = \text{mod}(v_1, 3) = \text{mod}(v_2, 3)$, $v_1$ and $v_2$ are the cell IDs of Tx-1 and Tx-2 respectively. Equation (4) is obtained by substituting $X_r^\delta$ defined equation (2) into equation (3). Furthermore, $\{C_k\}$ and $\{D_k\}$ are the channel weights on the $k^{th}$ subcarrier on the links from Tx-2 and Tx-1 to the UE, respectively. Note that although 2 transmit antennas are used in this example, the illustrated method 500 is applicable to systems with more than 2 transmit antennas.

The UE may subsequently calculate a plurality of frequency domain channel weights at 506. For example, the frequency domain channel weights $S_r$ at the $r^{th}$ RS RE may be calculated according to least squares (LS) criterion as follows:

$$\hat{S}_r = Y_r / X_r \text{ for } r=0,1,\ldots,L-1, \quad (5)$$

After calculating the frequency domain channel weights, the UE may execute an Inverse FFT (IFFT) operation at 508.

For example, an L-point IFFT may be performed as follows to obtain the combined channel impulse response (CIR) $\{s_n\}$ in the time domain.

$$\hat{s}_n = \sum_{r=0}^{L-1} \hat{S}_r e^{j2\pi nr/L}, \quad (6)$$

$$\hat{s}_n = \sum_{r=0}^{L-1} \hat{\overline{C}}_r e^{jr2\pi(n - \frac{K\Delta\varphi L}{2\pi})/L} + \sum_{r=0}^{L-1} \hat{\overline{D}}_r e^{j2\pi nr/L}, \quad (7)$$

The above equation can be expressed in terms of the CIRs $\{\hat{c}_n\}$ and $\{\hat{d}_n\}$ from Tx-2 and Tx-1 respectively as follows:

$$\hat{s}_n = \hat{c}_{(n - \frac{K\Delta\varphi L}{2\pi})} + \hat{d}_n, \quad (8)$$

From the above equation, it can be seen that the combined CIR has two CIRs, $\{\hat{d}_n\}$ and a delayed response $\{\hat{c}_n\}$. The time separation between the two channel responses is given as $$\frac{K\Delta\varphi L}{2\pi}.$$

After the IFFT operation, the UE may perform filtering operations at 510 to separate the multiple CIRs. A low pass filter or other advanced filtering or windowing techniques may be used at this step.

After the filtering operation to separate the multiple CIRs, the UE may execute a second FFT operation based on the filtered signals at 512. The second FFT is to generate the frequency-domain channel coefficients corresponding to the links between the multiple transmit antennas and the UE, e.g., link between Tx-1 to UE and link between Tx-2 to UE. Finally, the UE may determine the channel coefficients of the links at 514 based on the results of the second FFT operation.

To estimate the channel coefficients based on the phase-rotated reference signals, there are certain conditions that need to be met when selecting the phase rotation value $\Delta\phi$. For example, the time separation between different channel responses introduced by phase-rotated reference signals would need to be greater than the maximum of the channel delay spread for the UE to separate the multiple CIRs. For two transmit antennas, as in this example, the conditions that need to be satisfied when selecting the phase rotation are listed as follows:

$$\begin{cases} \frac{K\Delta\varphi L}{2\pi} > \max_i \tau_i \\ \frac{K\Delta\varphi L}{2\pi} + \max_i \tau_i \leq \frac{1}{K\Delta f}, \end{cases} \quad (9)$$

where $\tau_i$ represents maximum delay spread for links corresponding to the transmit antennas, t=1, 2, and $\Delta f$ denotes subcarrier spacing. The first condition implies that $$\frac{K\Delta\varphi LT}{2\pi}$$

needs to be greater than the maximum of the two maximum delay spreads $\tau_i$ corresponding to the CIRs of the two links. The second condition above is necessary for the UE to be able to distinguish the two CIRs. For instance, if the sum of $$\frac{K\Delta\varphi LT}{2\pi}$$

and the larger of the two maximum delay spreads exceeds $$\frac{1}{K\Delta f},$$

the second CIR will be cyclically delayed to the point where it will start overlapping with the first CIR. Hence, to avoid this problem, the second condition needs to be met when choosing $\Delta\varphi$. This problem may also be circumvented by simply choosing $\Delta\varphi$ to meet the following conditions:

$$\begin{cases} \frac{K\Delta\varphi L}{2\pi} > \max_i \tau_i \\ \frac{K\Delta\varphi L}{2\pi} \leq \frac{1}{K\Delta f}, \end{cases} \quad (10)$$

Equation (10) is equivalent to equation (9) in that the second condition of equation (10) is obtained by replacing the first condition in equation (9) into the second condition in equation (9). Similarly, equation (10) provides conditions for choosing the phase rotation value for two transmit antennas.

The phase rotated RS scheme described in this example in the context of two transmit antenna ports is extendable to systems configured with more transmit antenna ports. In this disclosure, the term of antenna port is inter-exchangeable with the term of antenna. The following is one extension for $N_{Tx}$ transmit antennas:

$$\begin{cases} \frac{K\Delta\varphi LT}{2\pi} > \max_i \tau_i \\ \frac{K\Delta\varphi LT}{2\pi} + (N_{Tx}-1)*\max_i \tau_i \leq \frac{1}{K\Delta f}, \end{cases} \quad (11)$$

or $$\begin{cases} \frac{K\Delta\varphi LT}{2\pi} > \max_i \tau_i \\ \frac{N_{Tx} K\Delta\varphi LT}{2\pi} \leq \frac{1}{K\Delta f}, \end{cases} \quad (12)$$

Equation (12) is equivalent to equation (11) in that the second condition of equation (12) is obtained by replacing the first condition in equation (11) into the second condition in equation (11). Similarly, equation (12) provides conditions for choosing the phase rotation value for $N_{Tx}$ transmit antennas.

The CIR separation procedure works well in situations where the OFDM symbol duration is large, the subcarrier separation K is small, or the maximum multipath delay spread is small (e.g., as in the case of small cells). The conditions for choosing $\Delta\varphi$ in the above equation imply that the delay factor $\delta$ introduced in Equation (1) satisfies $$\frac{N \cdot \max_i \tau_i}{KLT} < \delta \leq \frac{N^2}{K^2 LN_{Tx}}, \quad (13)$$

where the delay factor can be chosen to be an arbitrary integer within the upper and lower bounds given therein.

Equation (1) can be generalized for multiple antenna ports as follows:

$$\Delta\varphi_p = \frac{2\pi\delta_p}{N}, \quad (14)$$

for $$p = 0, 1, \ldots, P-1,$$

where P is the number of available transmit antennas. In a special case, where the relative phase shift between the antennas is kept the same, the above equation can be expressed as follows:

$$\Delta\varphi_p = \frac{2\pi\delta}{N}, \quad (15)$$

for $$p = 0, 1, \ldots, P-1.$$

In some implementations consistent with this disclosure, the RS REs transmitted from each transmit antenna can be multiplied with an orthogonal cover code (OCC). The OCC can be of length M where L=vM and v is an integer. M is a design parameter and selected such that the channel doesn't change significantly over MK REs over the OFDM symbol. In this case the RS REs transmitted over the pth antenna can be expressed as follows:

$$X_k^p = X_k B_{mod(k,M)}^p, \quad (16)$$

where $B_i^p$, $i=0, \ldots, M-1$ is the pth orthogonal cover code (OCC). Here we assume that there are at least $N_{TX}$ of length M (where $M \geq N_{TX}$) orthogonal cover codes available at the transmitter.

From the received signal model in Equation (3), the channel weight, $S_r$, at the $r^{th}$ RS RE can be estimated, for example, according to least squares (LS) criterion as follows:

$$\hat{S}_r = Y_r/X_r \text{ for } r=0,1,\ldots,L-1, \quad (17)$$

$$S_r = \sum_{i=0}^{N_{Tx}-1} C_r^i B_{mod(r,M)}^i + N_r, \quad (18)$$

where $C_r^i$ is the channel weight over the rth RSRE representing the channel between the ith transmit antenna and the UE.

Assume that the CFR is unchanged during H, REs, the above equation can be re-written as follows:

$$S_{\ell M+j} = \sum_{i=0}^{N_{Tx}-1} C_\ell^i B_j^i + N_{\ell M+j} \quad (19)$$

$$j = 0, \ldots, M-1 \text{ and } \ell = 0, \ldots, \frac{L}{M}-1,$$

or $$S_\ell = BC_\ell + N_\ell \text{ for } \ell = 0, \ldots, \frac{L}{M} - 1, \quad (20)$$

where $$B = [B^0 \ B^1 \ \ldots \ B^{N_{Tx}-1}], \quad (21)$$

$$B^p = [B_0^p \ B_1^p \ B_2^p \ \ldots \ B_{M-1}^p]^T, \quad (22)$$

$$C_\ell = [C_{(\ell-1)M} \ C_{(\ell-1)M+1} \ \ldots \ C_{(\ell-1)M+M-1}]^T. \quad (23)$$

The frequency domain channel weights, $\hat{C}_l$, can be estimated, for example according to the MMSE criterion, as follows:

$$\hat{C}_l = (B^H B + \hat{\eta}_0)^{-1} B^H S_l, \quad (24)$$

where $\hat{\eta}_0$ is the estimate of the noise power spectral density. For example, the OCC for two transmit antennas can be selected as the rows of Hadamard matrix $H_{2\times 2}$ (when the channel variation is insignificant over 2K REs within an OFDM symbol).

$$H_{2\times 2} = \begin{bmatrix} 1 & 1 \\ 1 & -1 \end{bmatrix}. \quad (25)$$

In this scenario, the method as presented in connection with FIG. 5 can be used at the UE to estimate the channel. Alternatively the method as presented in connection with FIG. 6 can be applied. In another example, the OCC for four transmit antennas can be selected as the rows of Hadamard matrix $H_{4\times 4}$ (when the channel variation is insignificant over 4K REs within a OFDM symbol).

$$H_{4\times 4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \quad (26)$$

Figure 6:
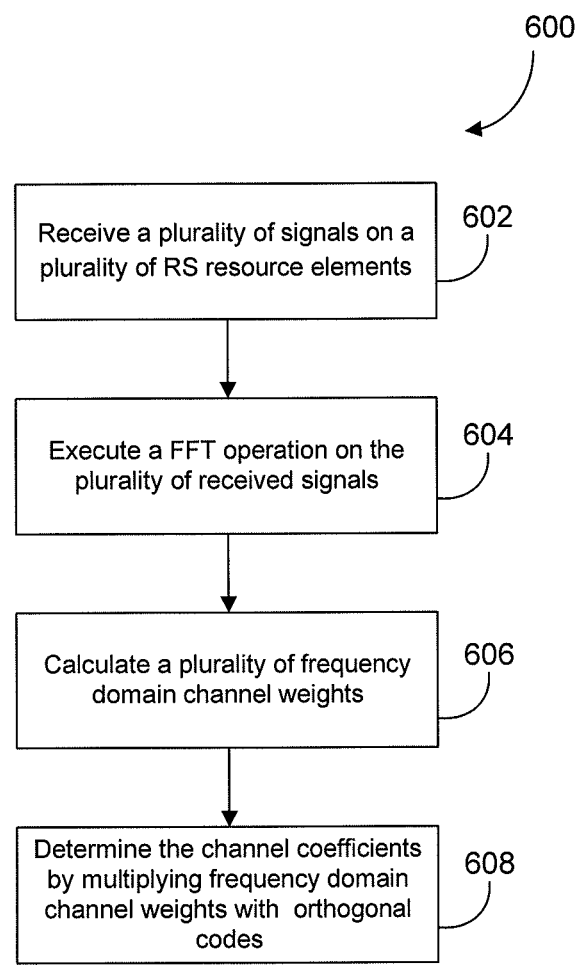
FIG. 6 illustrates a flow diagram of another example method for determining channel coefficients using phase-rotated reference signals, in accordance with an embodiment of the present disclosure.

In this scenario, the method as presented in connection with FIG. 6 can be applied at the UE to estimate the channel. When there three transmit antennas and the first 3 rows are used as the OCC, either the method presented in connection with FIG. 5 or FIG. 6 can be applied at the UE to estimate the channel.

In some implementations, the delay factor $\delta^{(p)}$ corresponding to the $p^{th}$ ($p=0, 1, \ldots, N_{Tx}-1$) antenna port in the proposed scheme can be set as $$\delta^{(p)} = \frac{pN}{KN_{Tx}}, \quad (27)$$

Then, the channel frequency responses (CFRs) corresponding to the different transmitters can be separated using orthogonal cover codes (OCC). For instance, the phase-rotated signal $X_k^{\delta,p}$ corresponding to the $k^{th}$ RSRE and the $p^{th}$ antenna port can be represented as $$X_k^{\delta,p} = X_k e^{-j2\pi d p/N_{Tx}} \text{ for } (k=0, \ldots, L-1) \text{ and } (p=0, 1, \ldots, N_{Tx}-1), \quad (28)$$

It should be noted that the channel frequency response needs to be flat or not varying over $N_{Tx}$ adjacent RSREs to ensure orthogonality of the OCCs. Given these conditions, the CFRs corresponding to the different transmit ports can be easily separated by the OCCs or other linear interpolation algorithm such as Minimum Mean Squared Error (MMSE). Under these conditions, the LS estimate vector corresponding to the $g^{th}$ group of RS REs is given as $$\hat{S}_g = [\hat{S}_{(g-1)N_{Tx}+1} \ \hat{S}_{(g-1)N_{Tx}+2} \ \ldots \ \hat{S}_{gN_{Tx}-1} \ \hat{S}_{gN_{Tx}}]^T \quad (29)$$

for $$g = 1, 2, \ldots, \frac{L}{N_{Tx}},$$

wherein $S_{(g-1)N_{Tx}+\beta} = Y_{(g-1)N_{Tx}+\beta} / X_{(g-1)N_{Tx}+\beta}$. Here, $Y_{(g-1)N_{Tx}+\beta}$ is defined as $$Y_{(g-1)N_{Tx}+\beta} = \Sigma_{p=0}^{N_{Tx}-1} X_{(g-1)N_{Tx}+\beta}^{\delta,p} \overline{C}_g^p, \quad (30)$$

where $X_{(g-1)N_{Tx}+\beta}^{\delta,p}$ is the phase-rotated signal corresponding to the $(g-1)N_{Tx}+\beta$ RE and the $p^{th}$ antenna port, and $\overline{C}_g^p$ represents the CFR corresponding to the $p^{th}$ port and the $g^{th}$ group of RS REs (recall the assumption that the CFR is flat over $N_{Tx}$ adjacent RS REs). Then, $\overline{C}_g^p$ can be estimated in the frequency domain as follows:

$$\hat{C}_g^p = [e^{j2\pi[(g-1)N_{Tx}+1]p/N_{Tx}} \ e^{j2\pi[(g-1)N_{Tx}+2]p/N_{Tx}} \ \ldots \ e^{j2\pi[gN_{Tx}]p/N_{Tx}}]^T \hat{S}_g, \quad (31)$$

Therefore, the frequency domain channel coefficients for links corresponding to multiple antennas can be determined using equation (31).

In some implementations, orthogonal codes (such as Walsh codes) can be applied in place of phase rotations in order for the CFRs corresponding to the different transmitters to be separated. For example, the signal $X_k^{\delta,p}$ corresponding to the $k^{th}$ RS RE and the $p^{th}$ antenna port may be replaced by an element $X_k^p$ belonging to the orthogonal codes. In this case, the CFR $\overline{C}_g^p$ corresponding to the $p^{th}$ antenna port and the $g^{th}$ group of RSREs can be estimated in the frequency domain as follows:

$$\hat{C}_g^p = [X_{(g-1)N_{Tx}+1}^p \ X_{(g-1)N_{Tx}+2}^p \ \ldots \ X_{gN_{Tx}-1}^p \ X_{gN_{Tx}}^p]^H \hat{Y}_g, \quad (32)$$

wherein $$\hat{Y}_g = [\hat{Y}_{(g-1)N_{Tx}+1} \ \hat{Y}_{(g-1)N_{Tx}+2} \ \ldots \ \hat{Y}_{gN_{Tx}-1} \ \hat{Y}_{gN_{Tx}}]^T \quad (33)$$

for $$g = 1, 2, \ldots, \frac{L}{N_{Tx}},$$

Here, $Y_{(g-1)N_{Tx}+\beta}$ is defined as $$Y_{(g-1)N_{Tx}+\beta} = \Sigma_{p=0}^{N_{Tx}-1} X_{(g-1)N_{Tx}+\beta} \overline{C}_g^p, \quad (34)$$

Therefore, the frequency domain channel coefficients for links corresponding to multiple antennas can be determined using equation (32). It should be noted that this scheme also requires the CFR to be flat or not varying over $N_{Tx}$ adjacent RS REs.

FIG. 6 illustrates a flow diagram of another example method 600 for determining channel coefficients using phase-rotated reference signals. In the exemplary method 600, orthogonal codes are used to determine the channel coefficients. As shown in FIG. 6, the UE first receives a plurality of signals on a plurality of RS resource elements at 602. Then the UE executes a FFT operation on the plurality of received signals at 604, to convert the received time-domain signals to frequency-domain signals $Y_r$. After the FFT operation, the UE calculates a plurality of frequency domain channel weights at 606. Similar to the method described in FIG. 5, the frequency domain channel weights $S_r$ at the $r^{th}$ RS RE may be calculated according to least squares (LS) criterion as follows:

$$\hat{S}_r = Y_r / X_r \text{ for } r=0,1,\ldots,L-1, \quad (35)$$

Next, the UE may determine the channel coefficients by multiplying the frequency domain channel weights with orthogonal codes at 608. For example, the method described above estimating $C_l^p$ with $\hat{Y}_g$ can be applied at this step. As can be seen here, the channel coefficients are determined in the frequency domain, without applying time-domain filtering techniques. Thus, the method 600 provides a simplified solution to resolve the channel coefficients in presence of the phase-rotated reference signals.

Figure 7:
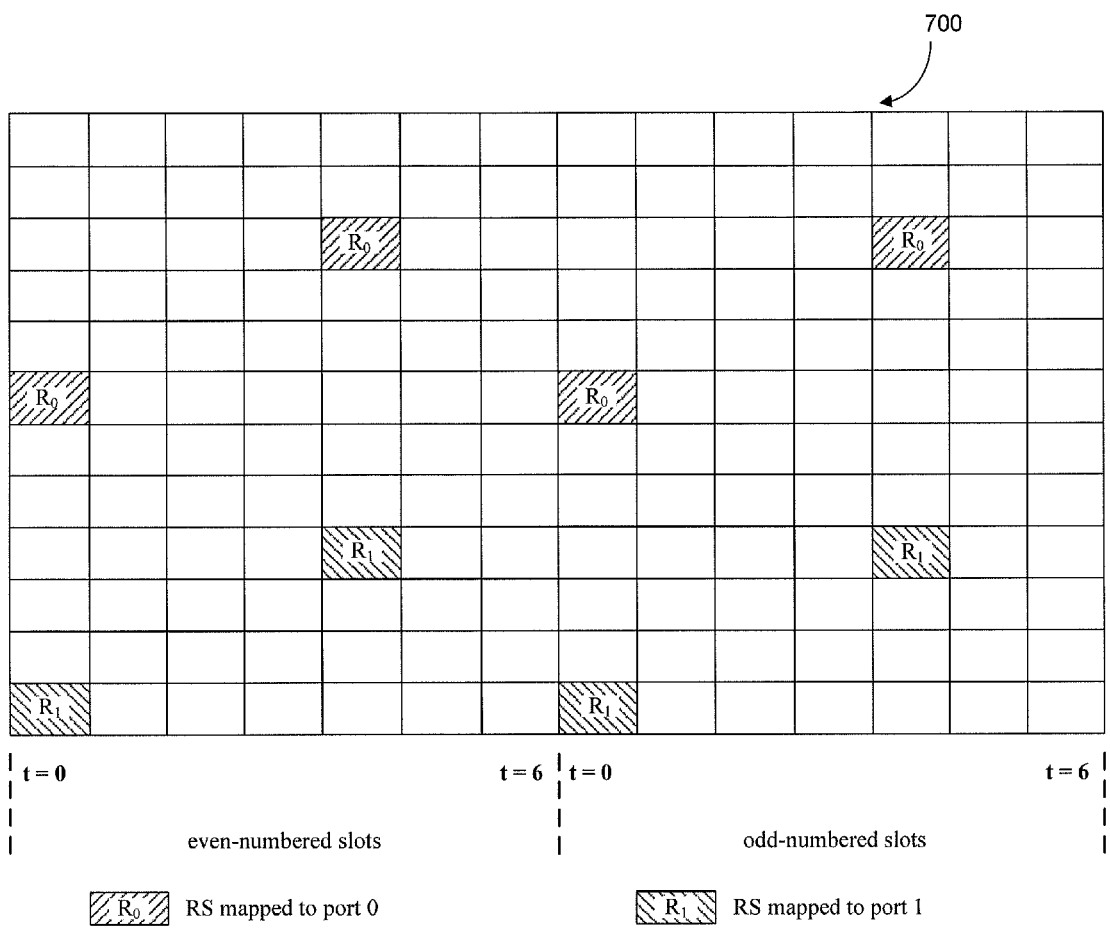
FIG. 7 illustrates an example reference signal design, in accordance with an embodiment of the present disclosure.

FIG. 7 illustrates an example reference signal design 700. The exemplary reference signal design 700 may be used for scenarios where the channel delay spreads are short which allows multiple CIRs to be fit within a time span of $$\frac{1}{K\Delta f}$$

without overlapping.

In FIG. 7, the horizontal axis represents time, the vertical axis represents frequency, and each rectangular grid represents a resource element. As shown in FIG. 7, the reference signals from the multiple transmission ports are staggered for the case of two transmit ports. For example, the reference signals for antenna port 1 $R_1$ are located on the same symbols on the time domain (i.e., the horizontal axis) as the symbols that the reference signals for antenna port 0 $R_0$ are located. Moreover, on the frequency domain (i.e., the vertical axis), the reference signals for antenna port 1 $R_1$ are located at the subcarriers with a constant distance from the subcarriers that the reference signals for antenna port 0 $R_0$ are located. In this example, reference signals $R_1$ are located 6 subcarriers below reference signal $R_0$.

This reference signal design takes advantage of the wide coherence bandwidths associated with the short CIRs. Since the reference signals transmitted from the different antenna ports are resource-wise orthogonal, the channels corresponding to the different antenna ports can be estimated using the interpolation algorithm. Note that in this exemplary reference signal design of FIG. 7, it is not necessary for the reference signals to be phase-rotated. Different symbols may be transmitted from the resource elements of $R_0$ and resource elements of $R_1$.

Figure 8:
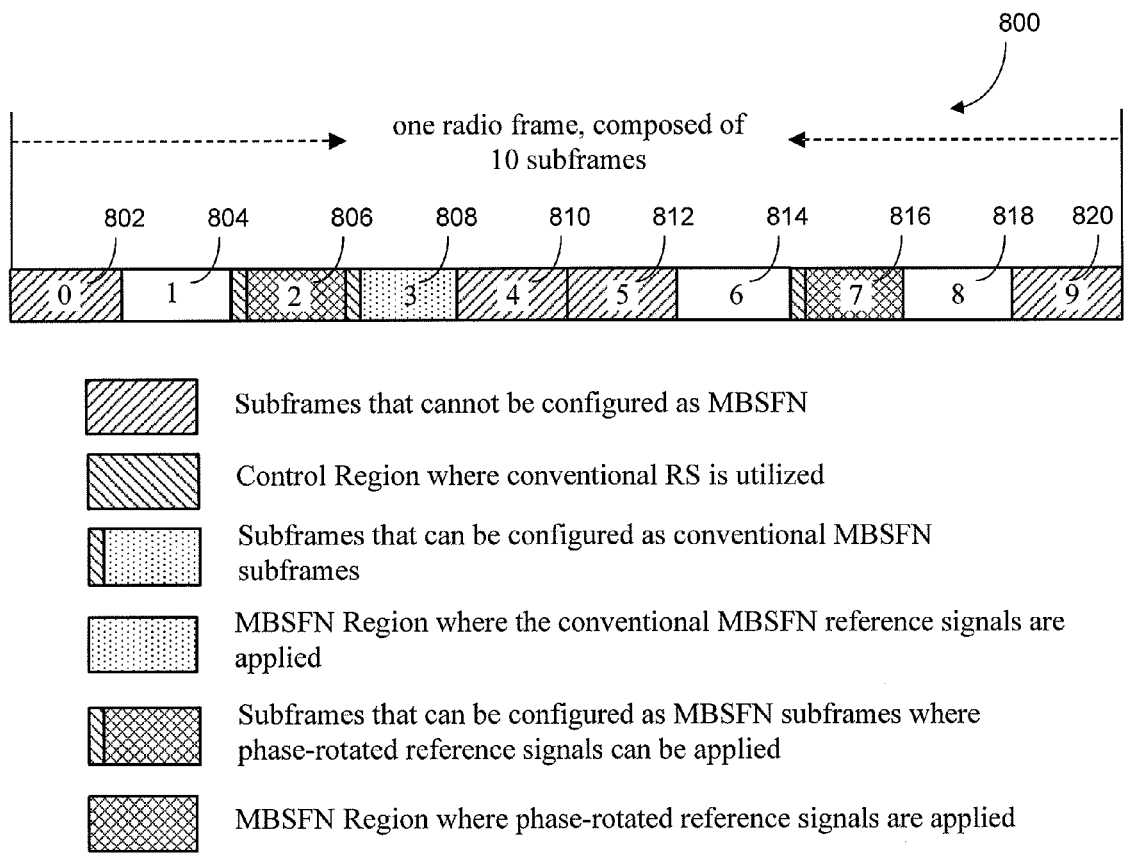
FIG. 8 illustrates an example framework for implementing embodiments of the present disclosure.

FIG. 8 illustrates an example framework 800 for implementing the phase-rotated reference signals for multiple antennas in the context of LTE/LTE-A systems. The general framework in FIG. 8 is presented for frequency division duplex (FDD) systems. However, it should be noted that the general framework can also be applied for time division duplex (TDD) systems.

As shown in FIG. 8, a plurality of subframes are configured as MBSFN subframes in one radio frame. In some implementations, a number of subframes are reserved for non-MBSFN subframes, such as subframes 0, 4, 5, and 9 (802, 810, 812, and 820) in this example. Subframes 1, 6, and 8 (804, 814, and 818) are not configured as MBSFN subframes in this example, although they can be configured as MBSFN subframes if necessary. As shown in FIG. 8, Subframe 3 (reference number 808) is configured as conventional MBSFN subframe, where conventional reference signals are used in the control region of the subframe, and conventional MBSFN reference signals for LTE Release 8, 9, or 10 are applied in the data region of the subframe.

Subframes 2 and 7 (806 and 816) are configured as MBSFN subframes, where the phase rotated reference signals can be applied. For these MBSFN subframes, conventional reference signals are used in the control region (e.g., PDCCH region) such that legacy UEs are still able to make channel measurements using the conventional reference signals in the control region. The phase-rotated reference signals are adopted in the data region of these MBSFN subframes, e.g., physical downlink shared channel (PDSCH) region, to reduce the RS overhead and enhance the transmission data rate.

The general framework in FIG. 8 is configured to support both legacy UEs and advanced UEs having the capability to decode the phase-rotated reference signals. In one example, advanced UEs could be UEs supporting features of LTE Release 12 or later. Specifically, this framework ensures backward compatibility since the following conditions are met: 1) the unicast layer 1/layer 2 control signaling region of the MBSFN subframes is unaffected. That is, the reference signals transmitted in the control region of the MBSFN subframes are the conventional (i.e., legacy) common reference signals (CRS) and no phase rotation is performed in this region. Therefore, legacy UEs could still receive the control region; and 2) the MBSFN subframes with phase rotated reference signals on multiple transmission ports in the MBSFN region can be time-division-multiplexed with conventional MBSFN subframes, which may carry conventional MBSFN reference signals in the MBSFN region. The first condition ensures that all terminals are still capable of receiving the unicast layer 1/layer 2 control region of the MBSFN subframe. By the second condition, legacy UEs may be confined to the conventional MBSFN subframes (e.g., subframe 3) which carry conventional MBSFN reference signals or the subframes that are reserved for non-MBSFN subframes, such as subframes 0, 4, 5, and 9, and the advanced UEs capable of receiving phase rotated RSs on multiple transmit antenna ports may receive transmissions from all subframes, the conventional MBSFN subframes (e.g., subframe 3), the MBSFN subframes with phase-rotated reference signals (e.g., subframes 2 and 7), and the subframes that are reserved for non-MBSFN subframes, such as subframes 0, 4, 5, and 9.

The subframe indices of the MBSFN subframes with phase-rotated reference signals and conventional MBSFN subframes shown in FIG. 8 are for illustration purpose. The subframe indices and total number of configured MBSFN subframes with phase-rotated reference signals can be different from those illustrated in FIG. 8 without departing from the scope of this disclosure.

In LTE/LTE-A, subframes to be reserved for MBSFN are configured using the MBSFN-SubframeConfig information element (IE) which is broadcasted as part of system information block (SIB) message, such as SystemInformationBlock-Type2. The MBSFN-SubframeConfig IE is defined in 3rd Generation Partnership Project (3GPP) standard technical specification (TS) 36.213 V10.5.0, "Radio Resource Control (RRC)." Hence, the additional signaling required to enable the phase shifted reference signals can be introduced by including a field(s) in the MBSFN-SubframeConfig IE or in SystemInformationBlockType13 (which is dedicated to carry most Multimedia Broadcast Multicast Service (MBMS) control information). Information regarding the phase shifts may be signaled to the UE via broadcast messages or UE-specific messages. The information regarding the phase shifts may provide the information of the phase shifts in a direct or an indirect manner. One option is the introduction of a field called RS-PhaseShifts which carries information on the phase shifts (i.e., $\Delta\phi_{p_1}$, $\Delta\phi_{p_2}$, . . . ) introduced to the original RS transmission on a given antenna port. The ports on which these phase-rotated RSs are transmitted (i.e., ports $p_1$, $p_2$, . . . corresponding to phase shift parameters $\Delta\phi_{p_1}$, $\Delta\phi_{p_2}$, . . . ) may be preconfigured. An example of the resulting MBSFN-SubframeConfig IE is shown in Table 2. Descriptions of fields of the MBSFN-SubframeConfig IE are provided in Table 3. Furthermore, if the MBSFN-RS-PhaseShifts field within the MBSFN-SubframeConfig IE is empty, the system may fall back to the conventional RS scheme. The phase rotation information may also be signaled in dedicated radio resource control (RRC) messages. Note that the phase rotation information may also be provided in the handover command message during the handover procedure.

TABLE 2

MBSFN-SubframeConfig IE Option 1

```
-- ASN1START
MBSFN-SubframeConfig ::=    SEQUENCE {
    radioframeAllocationPeriod   ENUMERATED {n1, n2, n4, n8,
                                 n16, n32},
    radioframeAllocationOffset   INTEGER (0..7),
    subframeAllocation           CHOICE {
        oneFrame                     BIT STRING (SIZE(6)),
        fourFrames                   BIT STRING (SIZE(24))
    }
    RS-PhaseShifts               CHOICE {
    onePort                      BIT STRING (SIZE(6)),
    twoPort                      BIT STRING (SIZE(12)),
    fourPort                     BIT STRING (SIZE(24))
    }
}
-- ASN1STOP
```

In some implementations, if the phase shift parameters are chosen such that $$\Delta\phi_{p_1}=\Delta\phi, \Delta\phi_{p_2}=2\Delta\phi, \Delta\phi_{p_3}=3\Delta\phi, \ldots, \quad (36)$$

then the common phase shift parameter $\Delta\phi$ can be specified as part of Layer 1 specifications or preconfigured via the SIB signaling. In this case, another field indicating the number of ports on which phase-rotated RSs are transmitted may be included in the MBSFN-SubframeConfig IE (shown in Table 4) or in the SIB13. Descriptions for the MBSFN-SubframeConfig IE are provided in Table 5. Note that the phase shift parameters may also be signaled in dedicated RRC messages. Note that the information may also be provided in the handover command message during the handover procedure.

TABLE 3

MBSFN-SubframeConfig field descriptions for Option 1 fourFrames

A bit-map indicating MBSFN subframe allocation in four consecutive radio frames, "1" denotes that the corresponding subframe is allocated for MBSFN. The bitmap is interpreted as follows:
FDD: Starting from the first radioframe and from the first/leftmost TABLE 3-continued MBSFN-SubframeConfig field descriptions for Option 1 bit in the bitmap, the allocation applies to subframes #1, #2, #3, #6, #7, and #8 in the sequence of the four radio-frames.
TDD: Starting from the first radioframe and from the first/leftmost bit in the bitmap, the allocation applies to subframes #3, #4, #7, #8, and #9 in the sequence of the four radio-frames.
The last four bits are not used. Uplink subframes are not allocated.
fourPort the first 6 bits represent the quantized value of $\Delta\phi_{p_1}$
the second 6 bits represent the quantized value of $\Delta\phi_{p_2}$
the third 6 bits represent the quantized value of $\Delta\phi_{p_3}$
the four 6 bits represent the quantized value of $\Delta\phi_{p_4}$
oneFrame "1" denotes that the corresponding subframe is allocated for MBSFN.
The following mapping applies:
FDD: The first/leftmost bit defines the MBSFN allocation for subframe #1, the second bit for #2, third bit for #3, fourth bit for #6, fifth bit for #7, sixth bit for #8.
TDD: The first/leftmost bit defines the allocation for subframe #3, the second bit for #4, third bit for #7, fourth bit for #8, fifth bit for #9. Uplink subframes are not allocated.
The last bit is not used.
onePort the 6 bits represent the quantized value of $\Delta\phi_{p_1}$
radioFrameAllocationPeriod, radioFrameAllocationOffset Radio-frames that contain MBSFN subframes occur when equation SFN mod radioFrameAllocationPeriod = radioFrameAllocationOffset is satisfied. Value n1 for radioframeAllocationPeriod denotes value 1, n2 denotes value 2, and so on. When fourFrames is used for subframe-Allocation, the equation defines the first radio frame referred to in the description below. Values n1 and n2 are not applicable when fourFrames is used.
RS-PhaseShifts Defines the phase shifts introduced to the orginal RS transmission
subframeAllocation Defines the subframes that are allocated for MBSFN within the radio frame allocation period defined by the radioFrameAllocationPeriod and the radioFrameAllocationOffset.
twoPort the first 6 bits represent the quantized value of $\Delta\phi_{p_1}$
the second 6 bits represent the quantized value of $\Delta\phi_{p_2}$

TABLE 4

MBSFN-SubframeConfig IE Option 2

```
-- ASN1START
MBSFN-SubframeConfig ::=    SEQUENCE {
    radioframeAllocationPeriod   ENUMERATED {n1, n2, n4, n8,
                                 n16, n32},
    radioframeAllocationOffset   INTEGER (0..7),
    subframeAllocation           CHOICE {
        oneFrame                     BIT STRING (SIZE(6)),
        fourFrames                   BIT STRING (SIZE(24))
    }
    PhaseShift-antennaPortsCount  ENUMERATED {an1, an2, an4,
                                  an8},
}
-- ASN1STOP
```

TABLE 5

MBSFN-SubframeConfig field descriptions for Option 2 fourFrames

A bit-map indicating MBSFN subframe allocation in four consecutive radio frames, "1" denotes that the corresponding subframe is allocated for MBSFN. The bitmap is interpreted as follows:

TABLE 5-continued

MBSFN-SubframeConfig field descriptions for Option 2

FDD: Starting from the first radioframe and from the first/leftmost
bit in the bitmap, the allocation applies to subframes #1, #2,
3, #6, #7, and #8 in the sequence of the four radio-frames.
TDD: Starting from the first radioframe and from the first/leftmost
bit in the bitmap, the allocation applies to subframes #3, #4,
7, #8, and #9 in the sequence of the four radio-frames.
The last four bits are not used. Uplink subframes are not allocated.
oneFrame "1" denotes that the corresponding subframe is allocated for MBSFN.
The following mapping applies:
FDD: The first/leftmost bit defines the MBSFN allocation for
subframe #1, the second bit for #2, third bit for #3, fourth
bit for #6, fifth bit for #7, sixth bit for #8.
TDD: The first/leftmost bit defines the allocation for
subframe #3, the second bit for #4, third bit for #7, fourth
bit for #8, fifth bit for #9. Uplink subframes are not allocated.
The last bit is not used.
PhaseShift-antennaPortsCount Parameter indicating the number of ports on which phase-rotated RSs are
transmitted where an1 corresponds to 1, an2 to 2 antenna ports etc.
...
radioFrameAllocationPeriod, radioFrameAllocationOffset Radio-frames that contain MBSFN subframes occur when equation SFN
mod radioFrameAllocationPeriod = radioFrameAllocationOffset is
satisfied. Value n1 for radioframeAllocationPeriod denotes value 1,
n2 denotes value 2, and so on. When fourFrames is used for subframe
Allocation, the equation defines the first radio frame referred to
in the description below. Values n1 and n2 are not applicable when
fourFrames is used.
subframeAllocation Defines the subframes that are allocated for MBSFN within the
radio frame allocation period defined by the
radioFrameAllocationPeriod and the radioFrameAllocationOffset.

In some implementations, the standards (e.g., LTE or LTE-A standards) may pre-configure one or multiple sets of phase shift values to be used for the phase-rotated reference signals. In this case, the network could signal the chosen preconfiguration to the UE. This signaling can be included as part of SIB2, SIB13, other SIB messages, or in dedicated RRC messages.

Figure 9:
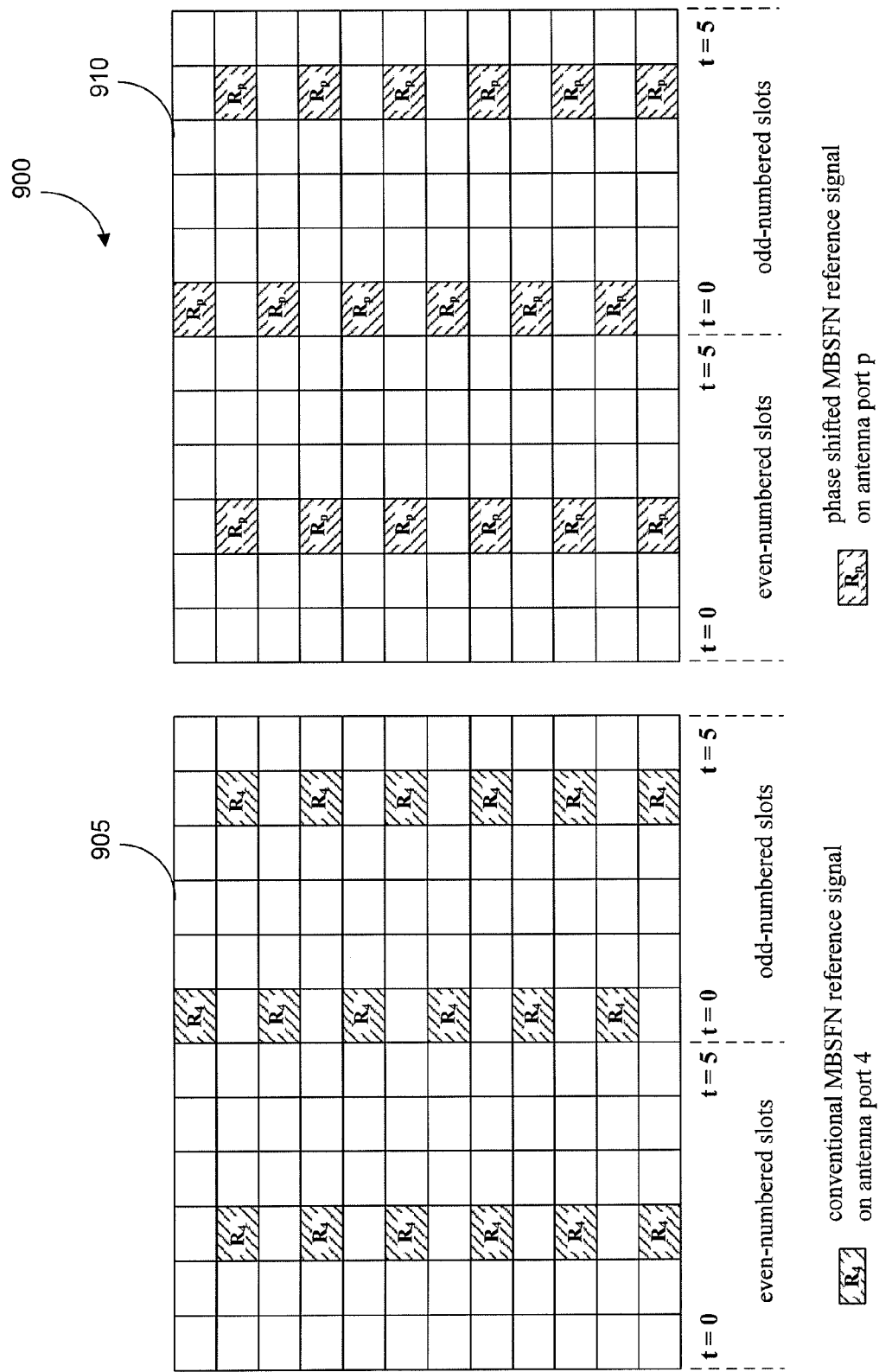
FIG. 9 illustrates an example phase-rotated reference signal design, in accordance with an embodiment of the present disclosure.

FIG. 9 illustrates an example phase-rotated reference signal design 900 for MBSFN subframes. As shown in FIG. 9, the reference signals in the MBSFN subframe (i.e., 910) are located at the same resource elements as those of the reference signals in the conventional MBSFN subframe (i.e., 905). It can also be seen that the phase-rotated reference signals for these MBSFN subframes are not included in the first and second symbols on the MBSFN subframes. The MBSFN reference signal structure denoted by $R_4$ in FIG. 9 corresponds to antenna port 4 and is generated without phase shifts. On the other hand, the MBSFN reference signal structure denoted by $R_p$ in FIG. 9 corresponds to port p and is generated by introducing a constant phase shift via parameter $\Delta\phi_p$ to the original MBSFN reference signal transmitted on port 4.

Since the MBSFN reference signals from antenna port 4 and p are transmitted on identical REs, the phase-shifted (i.e., phase-rotated) MBSFN reference signals do not increase reference signal overhead. Using CIR separation methods described previously in connection with FIGS. 5 and 6, the channels corresponding to ports 4 and p can be estimated at the UE. Hence, the phase-shifted reference signals can be applied to support open-loop MIMO or transmit diversity for MCH transmissions. The illustrated phase-rotated reference signal design 910 can also be extended to the case with four transmit antennas by introducing at least three phase shifts (via parameters $\Delta\phi_{p_1}$, $\Delta\phi_{p_2}$, and $\Delta\phi_{p_3}$) to the original MBSFN RS transmission and transmitting them on ports $p_1$, $p_2$, and $p_3$ (in addition to the original MBSFN RS transmission on port 4).

Therefore, in the context of LTE/LTE-A, the phase-shifted reference signals can be applied to support open-loop MIMO or transmit diversity for Multicast Channel (MCH) transmissions, particularly under scenarios where the maximum delay spread is small (i.e., as in the case of small cells). The application of the phase-shifted reference signals may also enable the transmission of reference signals from multiple ports using the same set of REs (thus, without increasing the reference signal overhead) during MCH transmissions in environments with small maximum delay spreads. An advantage of introducing phase rotated reference signals in MBSFN subframes is that it enables the employment of open-loop MIMO or transmit diversity for MCH transmissions. The phase-shifted reference signals can also be applied to the non-MBSFN scenarios when maximum delay spread is small, for example, in the case of small cells which generally have smaller delay spread. In some other scenarios, even though the maximum delay spread is not small, the techniques may still be applied if the OFDM symbol duration is large or the RSRE separation parameter K (defined in FIG. 4) is small.

Figure 10:
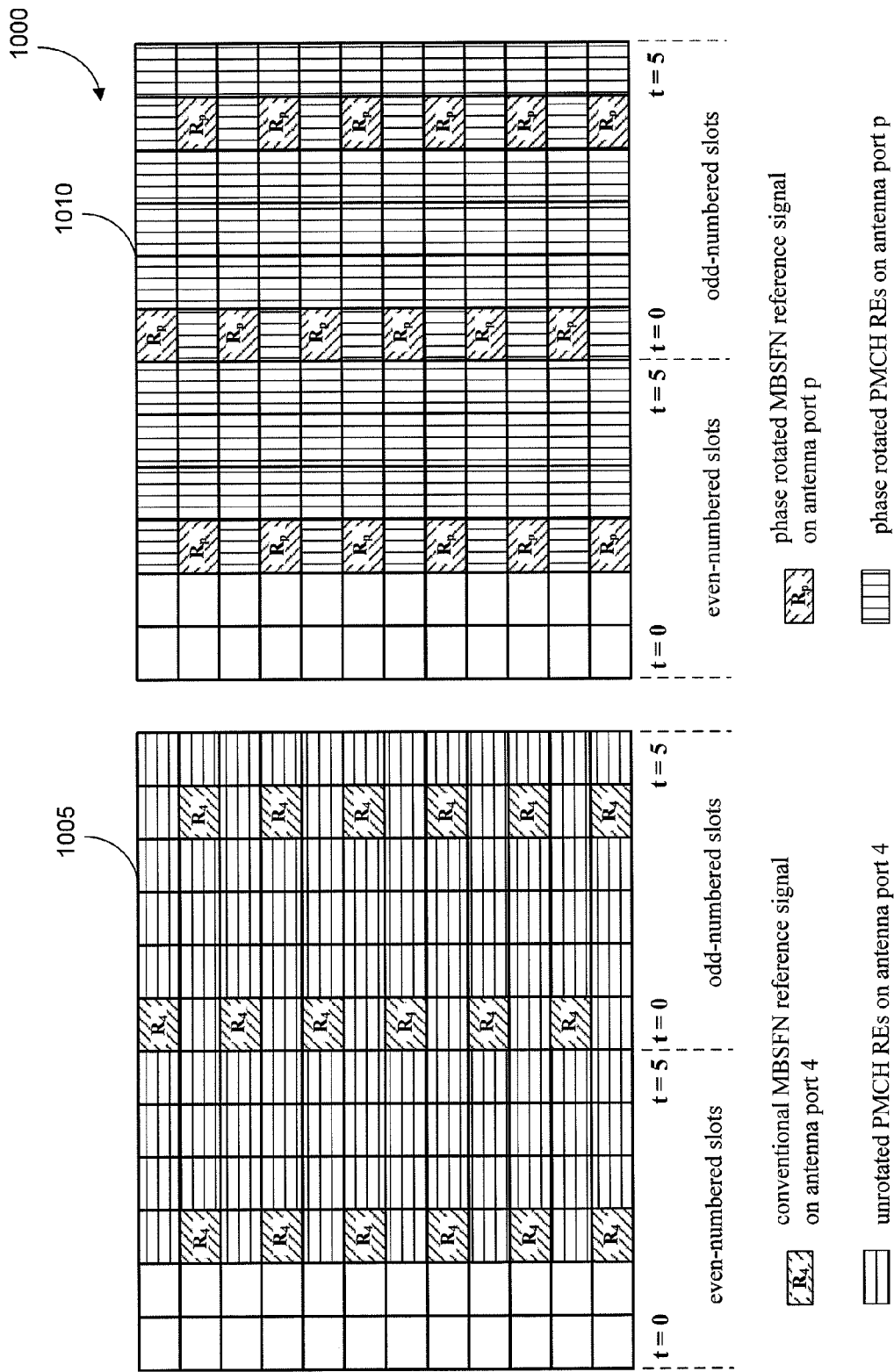
FIG. 10 illustrates another example phase-rotated reference signal design, in accordance with an embodiment of the present disclosure.

FIG. 10 illustrates another example phase-rotated reference signal design 1000. As illustrated in FIG. 10, the reference signals and data signals in 1010, i.e., the Physical Multicast Channel (PMCH) region of the MBSFN subframes, are both phase-rotated, while the reference signals and data signals in 1005, i.e., the PMCH region of the conventional MBSFN subframes are unrotated. This phase rotation is illustrated by contrasting lines, with the horizontal lines in 1005 and the vertical lines in 1010.

By phase shifting PMCH REs on a given antenna port p with the same $\Delta\phi_p$ used to shift the MBSFN RS on that antenna, legacy UEs can estimate the channel using LTE Release 8, antenna port 4, even though the phase rotated ports p are present. In this way, the MBSFN reference signals will have the same effective channel as the PMCH data, and the UE can receive PMCH using conventional Rel-8 channel estimates. Furthermore, the technique is equivalent to low delay CDD since the phase shifts delay the antenna ports differently. Therefore, the PMCH will have spatial diversity gain. In order for the phase shifted PMCH ports to appear as though they are delayed by the channel, the delay is desired to be significantly smaller than the cyclic prefix (CP) length (from a backward compatibility perspective). For example, if we select the delay to be half the length of the extended CP, then since the extended CP is ¼ of an OFDM symbol, the shift should be no more than ⅛ of an OFDM symbol, and so $$\Delta\varphi = \frac{2\pi}{8}.$$

Therefore, a minimum of a length 4 OCC is used on every other carrier to support a second antenna port. If 4 antenna ports are needed, the shift should be no more than 1/16 of an OFDM symbol, and so $$\Delta\varphi = \frac{2\pi p}{16}$$

for antenna port p.

Advanced UEs are informed of the presence and configuration of the additional antenna ports (including, e.g., the phase shift in SIB13, as described above), and so can estimate the additional antenna ports independently. Given these channel estimates, the advanced UEs can then receive independent transmissions on the antenna ports using e.g. MIMO or SFBC transmissions. Therefore, a single set of reference signals can be used for both legacy and multi-port (e.g., MIMO or SFBC) transmissions.

Using one set of reference signals for both legacy and multi-port transmissions may be beneficial to reduce RS overhead, although this may not be used in all configurations. If CDD and multi-port transmissions can be multiplexed in a subframe, the one set of RS can be used for channel estimation of either transmission, avoiding the need for extra RS. Also, if channel state information (CSI) measurements are used for MIMO (e.g. those that report the MIMO rank, achievable modulation and coding scheme for single antenna transmission and/or one or more MIMO layers), the use of a single set of RS for both backward compatible transmissions and multi-port CSI measurements may allow more measurement opportunities.

Figure 11:
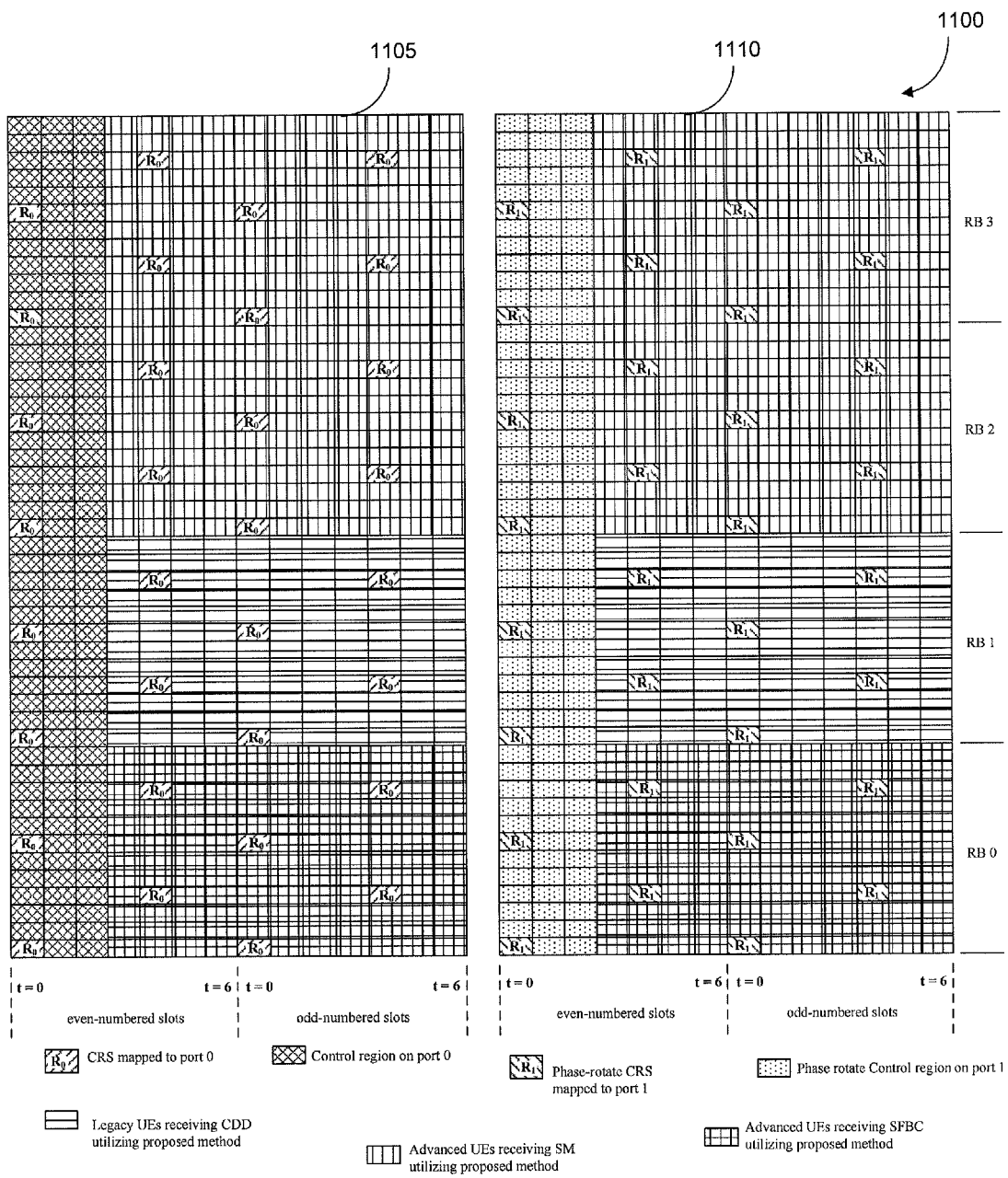
FIG. 11 illustrates an example application of phase-rotated reference signals, in accordance with an embodiment of the present disclosure.

FIG. 11 illustrates an example application 1100 of phase-rotated reference signals. Specifically, FIG. 11 illustrates an example of how the phase-rotated reference signals can be utilized to support the various transmission methods described in Table 1. The left side of the FIG. 1105 illustrates an example of a conventional control and data transmission using the conventional reference signals without phase rotation and the right side of the FIG. 1110 shows the control and data transmission using the phase-rotated reference signals. The reference signals in the control region of 1110 are phase-rotated, as well as the control channel REs in 1110.

In this example, a legacy UE is scheduled to receive CDD in resource block (RB) 1. It should be noted that in RB1, the data REs will be phase rotated using the same $\Delta\phi$ used to rotate the phase of the CRS on that port. On RB 0, an advanced UE capable of detecting the presence of phase-rotated CRS is scheduled to receive SFBC. On RBs 2-3, another advanced UE capable of detecting the presence of phase-rotated CRS is scheduled for spatial multiplexing. Although the example is restricted to four RBs and two transmission ports, the scheme can be easily extended to other number of RBs and transmission ports without departing from the scope of this disclosure.

Therefore, FIG. 11 shows that the legacy UEs and advanced UEs using different MIMO techniques can be supported in a single set of phase-rotated reference signals. This single set of phase-rotated reference signals simplifies the implementation of reference signals without compromising the performance of the legacy UEs. Moreover, this single set of phase-rotated reference signals allows the advanced UEs to operate in various MIMO modes with reduced reference signal overhead.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of wireless communication in an Orthogonal Frequency Division Multiplexing (OFDM) system, comprising:
   transmitting a first set of reference signals from a first transmit antenna on a plurality of reference signal (RS) resource elements of the OFDM system, the RS resource elements representing a set of time and frequency resources;
   transmitting a second set of reference signals from a second transmit antenna on the plurality of RS resource elements, wherein the second set of reference signals is identical to a first phase rotation of the first set of reference signals in a frequency domain;
   transmitting a first set of data signals from the first transmit antenna on a plurality of data resource elements; and
   transmitting a second set of data signals from the second transmit antenna on the plurality of data resource elements, wherein the second set of data signals is identical to the first phase rotation of the first set of data signals in the frequency domain.

2. The method of claim 1, wherein the first and second set of data signals are transmitted from the first and second transmit antennas using spatial multiplexing.

3. The method of claim 1, wherein the first and second set of data signals are transmitted from the first and second transmit antennas using Space Frequency Block Coding (SFBC).

4. The method of claim 1, wherein the plurality of RS resource elements are in a Physical Downlink Shared Channel (PDSCH) region.

5. The method of claim 1, wherein the plurality of RS resource elements are in a Physical Downlink Control Channel (PDCCH) region.

6. The method of claim 1, wherein the plurality of RS resource elements are in a Physical Multicast Channel (PMCH) region.

7. The method of claim 1, wherein information regarding the first phase rotation is broadcast in a System Information Block (SIB) message.

8. The method of claim 1, wherein information regarding the first phase rotation is signaled in a Radio Resource Control (RRC) message.

9. The method of claim 1, further comprising:
   transmitting a plurality of sets of reference signals from a plurality of transmit antennas on the plurality of RS resource elements, respectively, wherein the plurality of sets of reference signals are identical to a plurality of phase rotations of the first set of reference signals in the frequency domain.

10. The method of claim 9, wherein each of the plurality of phase rotations is multiple times of the first phase rotation.

11. The method of claim 9, wherein information regarding the plurality of phase rotations is broadcast in a system information block (SIB) message.

12. The method of claim 9, wherein information regarding the plurality of phase rotations is signaled in a Radio Resource Control (RRC) message.

13. The method of claim 1, wherein the plurality of RS resource elements are in a Multicast-Broadcast Single Frequency Network (MBSFN) subframe.

14. A base station device for wireless communications in an Orthogonal Frequency Division Multiplexing (OFDM) system, the base station device configured to:
  transmit a first set of reference signals from a first transmit antenna on a plurality of reference signal (RS) resource elements of the OFDM system, the RS resource elements representing a set of time and frequency resources;
  transmit a second set of reference signals from a second transmit antenna on the plurality of RS resource elements, wherein the second set of reference signals is identical to a first phase rotation of the first set of reference signals in a frequency domain;
  transmit a first set of data signals from the first transmit antenna on a plurality of data resource elements; and
  transmit a second set of data signals from the second transmit antenna on the plurality of data resource elements, wherein the second set of data signals is identical to the first phase rotation of the first set of data signals in the frequency domain.

15. The base station device of claim 14, wherein the first and second set of data signals are transmitted from the first and second transmit antennas using spatial multiplexing.

16. The base station device of claim 14, wherein the first and second set of data signals are transmitted from the first and second transmit antennas using Space Frequency Block Coding (SFBC).

17. The base station device of claim 14, wherein the plurality of RS resource elements are in a Physical Downlink Shared Channel (PDSCH) region.

18. The base station device of claim 14, wherein the plurality of RS resource elements are in a Physical Downlink Control Channel (PDCCH) region.

19. The base station device of claim 14, wherein the plurality of RS resource elements are in a Physical Multicast Channel (PMCH) region.

20. The base station device of claim 14, wherein information regarding the first phase rotation is broadcast in a System Information Block (SIB) message.

21. The base station device of claim 14, wherein information regarding the first phase rotation is signaled in a Radio Resource Control (RRC) message.

22. The base station device of claim 14 further configured to:
  transmit a plurality of sets of reference signals from a plurality of transmit antennas on the plurality of RS resource elements, respectively, wherein the plurality of sets of reference signals are identical to a plurality of phase rotations of the first set of reference signals in the frequency domain.

23. The base station device of claim 22, wherein each of the plurality of phase rotations is multiple times of the first phase rotation.

24. The base station device of claim 22, wherein information regarding the plurality of phase rotations is broadcast in a system information block (SIB) message.

25. The base station device of claim 22, wherein information regarding the plurality of phase rotations is signaled in a Radio Resource Control (RRC) message.

26. The base station device of claim 14, wherein the plurality of RS resource elements are in a Multicast-Broadcast Single Frequency Network (MBSFN) subframe.

27. A method of wireless communication, comprising:
  configuring a plurality of Multicast-Broadcast Single Frequency Network (MBSFN) subframes;
  transmitting a first set of reference signals from a first transmit antenna on a plurality of reference signal (RS) resource elements during at least one of the plurality of MBSFN subframes, the RS resource elements representing a set of time and frequency resources;
  transmitting a second set of reference signals from a second transmit antenna on the plurality of RS resource elements during the at least one of the plurality of MBSFN subframes, wherein the second set of reference signals is identical to a first phase rotation of the first set of reference signals in a frequency domain;
  transmitting a first set of data signals from the first transmit antenna on a plurality of data resource elements; and
  transmitting a second set of data signals from the second transmit antenna on the plurality of data resource elements, wherein the second set of data signals is identical to the first phase rotation of the first set of data signals in the frequency domain.

28. A base station device for wireless communications, the base station device configured to:
  configure a plurality of Multicast-Broadcast Single Frequency Network (MBSFN) subframes;
  transmit a first set of reference signals from a first transmit antenna on a plurality of reference signal (RS) resource elements during at least one of the plurality of MBSFN subframes, the RS resource elements representing a set of time and frequency resources;
  transmit a second set of reference signals from a second transmit antenna on the plurality of RS resource elements during the at least one of the plurality of MBSFN subframes, wherein the second set of reference signals is identical to a first phase rotation of the first set of reference signals in a frequency domain;
  transmit a first set of data signals from the first transmit antenna on a plurality of data resource elements; and
  transmit a second set of data signals from the second transmit antenna on the plurality of data resource elements, wherein the second set of data signals is identical to the first phase rotation of the first set of data signals in the frequency domain.

* * * * *